Aug. 8, 1944.　　　H. R. C. ANTHONY ET AL　　　2,355,197
BATTERY CONSTRUCTION
Filed Dec. 10, 1941
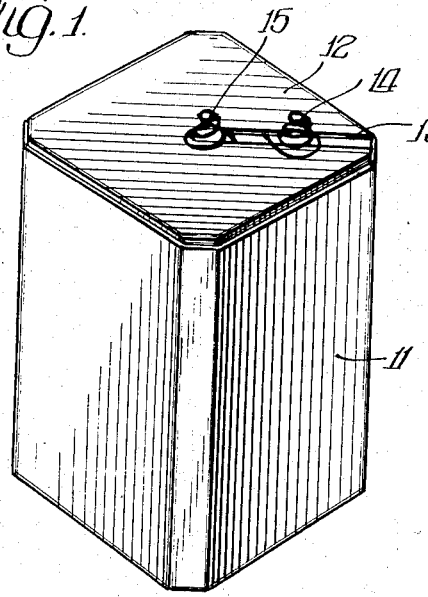
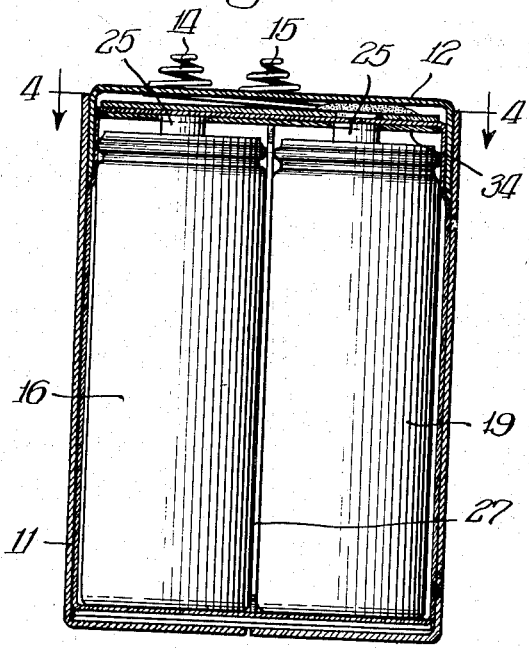
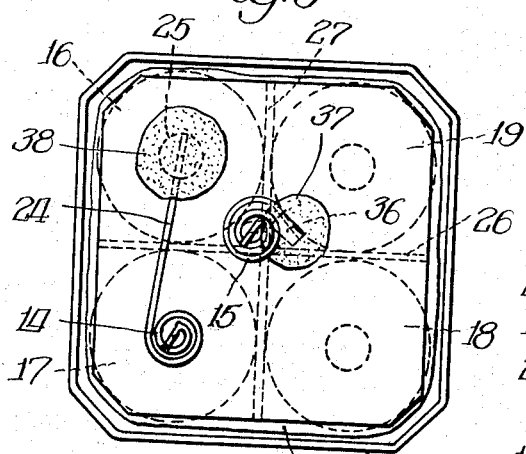
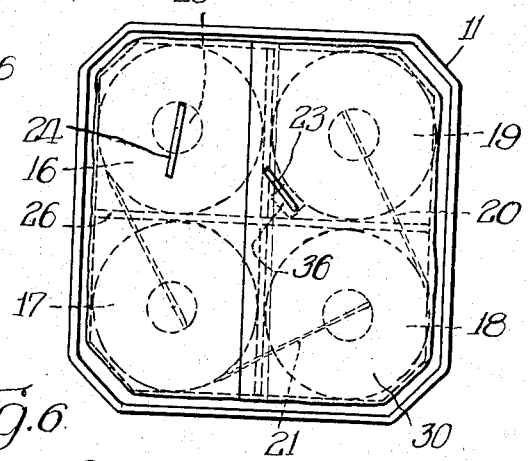
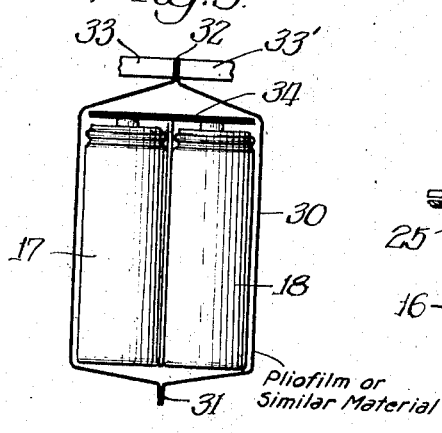
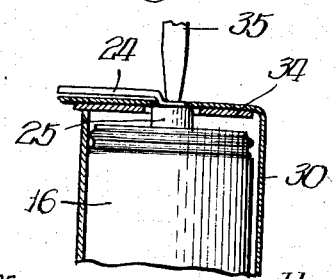
INVENTORS.
Herman R. C. Anthony,
Henry G. Friang,
BY Patented Aug. 8, 1944

2,355,197

UNITED STATES PATENT OFFICE 2,355,197

BATTERY CONSTRUCTION

Herman R. C. Anthony and Henry G. Friang, Madison, Wis., assignors to Marathon Battery Company, Wausau, Wis., a corporation of Wisconsin Application December 10, 1941, Serial No. 422,325

7 Claims. (Cl. 136—132)

This invention relates to a new and improved battery construction and more particularly to a construction of dry cell batteries including a closure or housing impervious to the electrolyte of the battery.

A dry cell as generally constructed comprises a zinc container serving as the negative electrode and the positive carbon electrode together with the electrolyte, depolarizing agents and other materials fitted within the housing. In use of the dry cells the metal container is usually enclosed in a paper or cardboard housing which serves to insulate the outer electrode from the flashlight, lantern or other unit in which the battery is used.

In actual use of such cells it is often found that the cells leak. This may occur during normal use or after the cell has become exhausted. It may be the result of any of a number of causes, such as faulty closure of the cell, a faulty zinc container or an eating away of the zinc due to overload, short circuiting or other abuse of the cell. The material leaking from a cell is electrolyte together with products of the reaction of the electrolyte upon other constituents of the cell. This leakage is highly corrosive in character and is not stopped by the normal cardboard or paper housing of a cell which is often an incomplete covering and is unsealed. The corrosive effect upon the flashlight or other container of the cell may merely make the cell difficult of removal but in aggravated cases it may completely ruin the lantern or flashlight.

Any sealed enclosure for a battery or cell, to be effective, must comprise material which is inert to the electrolyte or other constituents of the cell. It further must be a non-conductor of electricity and must be tough and not readily broken or torn. In addition, it must be low in cost and easily handled and applied if it is to be of commercial importance since cells and batteries are manufactured and sold at low cost and in large quantities.

It is an object of the present invention to provide a new and improved leakproof dry cell or battery.

It is a further object to provide a leakproof container with the necessary electrical connections extending through the container through sealed openings therein.

It is an additional object to provide a method of assembling the container with the cell or battery, which method is adapted for commercial production.

It is another object to provide a method of assembly in which the cell or battery is completely sealed in the leakproof container and the electrical connections secured to the battery through the container by means of soldering operations.

Other and further objects will appear as the description proceeds.

We have shown a preferred embodiment of our invention in the accompanying drawing, in which—

Figure 1 is a perspective view of a complete four cell battery;

Figure 2 is a vertical section through such a battery;

Figure 3 is a plan view of the battery with the outer cover removed;

Figure 4 is a horizontal section taken on line 4—4 of Figure 2;

Figure 5 is an elevation on a reduced scale showing the method of sealing the leakproof container, and Figure 6 is a fragmentary vertical section showing the method of securing an electrical connection to the battery.

The completed battery as shown in Figure 1 comprises an outer housing 11 normally formed of cardboard and a cover 12 of similar material fitted in the top of the housing 11. The cover 12 is slotted at 13 so that it may be slipped through the lower coils of the two terminals 14 and 15, which are in the form of coiled spring wires. As shown in Figures 2 to 4 of the drawing, the particular battery selected for purposes of illustration comprises four separate cells 16, 17, 18 and 19. These cells are connected in series by the wires 20, 21 and 22, as shown in Figure 4. The center or negative terminal 15 of the battery assembly is connected by wire 23 to the zinc shell or outer electrode of the cell 19. The positive electrode 14 of the assembled battery is connected by wire 24 with the central carbon electrode 25 of cell 16. The four cells are separated by the dividing members 26 and 27 which are interfitted at right angles to each other. It will be understood that these members 26 and 27 may be formed of waxed cardboard or any suitable insulating material.

The method of assembling the cell block in the outer container is shown in Figure 5. The unit of four cells is placed in the bag 30 of rubber hydrochloride, a product on the market known as Pliofilm through its open end. This bag 30 is made in the same manner as the usual paper bag, having its lower end sealed as shown at 31. It may have a longitudinal seam similarly sealed, such seam not having been shown in the drawing.

If the bag is formed of material which is manufactured in tubular form, such longitudinal seam is unnecessary.

The Pliofilm is a commercial material available on the market and has several characteristics which render it particularly suitable for the present purpose. The material is impervious to the electrolytes commonly used in dry cells and is also impervious or inert to the products of decomposition of such cells when they break down under use or abuse. The Pliofilm is also relatively inexpensive and easily handled. It is tough and not easily punctured. It is also substantially transparent so that the location of the elements within the bag are readily apparent. The material flows under heat and consequently the bottom seam, as for example the seam 31 of Figure 5, is readily made by application of heat to the outer faces of the plies of Pliofilm, which are in contact with each other. Similarly, after the cell block is inserted in the bag 30, the upper edges are brought together at 32 and are pressed between hot bars 33 and 33'. The application of a moderate temperature for a brief period serves to integrally unite the facing plies without destroying or deteriorating the material. After this sealing operation takes place, the cell block is sealed in a completely closed bag of material impervious to the constituents of the cells or the products of those constituents under any circumstances which may occur.

In Figure 6 the method of securing the connections to the cells is shown. The cell 16 is shown with its capped carbon electrode 25 extending upwardly above the cell walls. A locating and spacing sheet of insulating material 34 is shown within the Pliofilm bag 30, this sheet having an opening corresponding with the electrode 25. The end of the connecting wire 24 is placed above the terminal 25 and a pointed soldering iron 35 is brought in contact with the wire 24. This iron will be at a soldering heat and will have been dipped in solder so that it carries with it a sufficient quantity of molten solder for making the connection. The heat of the solder and of the soldering iron serves to destroy the portion of the Pliofilm bag which is engaged by the solder and by the iron so that an effective solder joint is made in spite of the fact that the battery assembly has been previously enclosed within the Pliofilm bag 30. It has been found that the Pliofilm has no bad effect upon the solder connection and does not prevent a clean contact between the solder and the terminal cap 25 on the center electrode.

The wire 23 is similarly soldered to the negative terminal of the battery assembly, which terminal may consist of a conducting flat strip 36 indicated in Figure 3, this strip being secured to the outer wall of the cell and extending upwardly above the wall to provide an overturned portion to receive the solder and end of the wire 23. A suitable locating opening is provided in the locating sheet of material 34 in a manner similar to that shown in Figure 6 in relationship to the other connection.

While if proper moderate soldering temperatures are used and the work is carefully done, there is no destruction of the Pliofilm beyond the actual soldered joint, nevertheless in order to insure an absolutely tight connection impervious to any of the battery constituents, it is found desirable to place a quantity of sealing material, such as indicated in the drawing at 37 and 38, on terminal wires 23 and 24 respectively. This sealing material may consist of tar, wax, asphalt or other suitable material which is insulating and sealing in character and which may be properly applied at a temperature such as not to injure the Pliofilm which it contacts.

After the terminal wires have been soldered to the battery assembly and the Pliofilm enclosure again rendered completely fluid-tight by the application of the sealing material, the battery assembly may be placed in the outer casing or housing 11 and the cover 12 applied to produce the finished commercial article shown in Figure 1. It will be understood that the Pliofilm container may be used with any type of battery, whether made up of one of more cells, and will function to protect the light or lantern casing or other adjacent housing from being injured in the event that the cells leak or are destroyed by use or abuse.

While Pliofilm has been described as particularly suitable for this purpose, it will be understood that other materials may be used. Such materials must have the characteristic of being impervious or inert to the constituents or products of the battery and of permitting the terminal wires to be soldered to the cell terminals through the material in the manner described. Such materials should also preferably be transparent or partially transparent so that the contents may be obserbed in the soldering and connecting operation. The material also should be flexible under normal temperature or humidity conditions which may arise so that it will not become stiff and crack or rupture in use.

While we have shown certain preferred embodiments of our invention it is to be understood that it is capable of modification to meet differing conditions and requirements, and we contemplate such variations as come within the spirit and scope of the appended claims.

What is claimed is:

1. A battery comprising a cell, a flexible casing enclosing the battery, the casing being formed of a material which is non-conducting and impervious to the constituents of the cell, electrical connections extending through small openings in the casing and soldered to the terminals of said battery, the material of said casing being destroyed by soldering heat to provide said openings at the point of soldering said electrical connections to said terminals, the solder employed for holding said connections to said terminals also serving to close said openings.

2. A battery comprising a cell, a flexible casing enclosing the battery, the casing being formed of a material which is non-conducting and impervious to the constituents of the cell, electrical connections extending through small openings in the casing and soldered to the terminals of said battery, the material of said casing being destroyed by soldering heat to provide said openings at the point of soldering said electrical connections to said terminals, the solder employed for holding said connections to said terminals also serving to close said openings, and additional sealing material sealing said openings.

3. A battery comprising a cell, a rubber hydrochloride casing enclosing the battery, electrical connections extending through small openings in the casing and soldered to the terminals of said battery, the material of the casing being destroyed by soldering heat to provide said openings at the point of soldering said electrical connections to said terminals, the solder employed for holding said connections to said terminal also serving to close said openings.

4. A battery comprising a cell, a rubber hydrochloride casing enclosing the battery, electrical connections extending through small openings in the casing and soldered to the terminals of said battery, the material of the casing being destroyed by soldering heat to provide said openings at the point of soldering said electrical connections to said terminals, the solder employed for holding said connections to said terminal also serving to close said openings, and additional sealing material for said openings.

5. The method of making a battery, which comprises placing a cell in a casing, sealing the casing, applying electrical connections at the terminals of said battery but outside of said sealed casing, applying molten solder on the outside of said casing at the location of said terminals, causing the heat of said solder to destroy said casing to provide small openings through said casing at the point of soldering said electrical connections to said terminals, and causing said connections to be soldered to said terminals and at the same time closing the openings so provided in said casing by the solder so applied.

6. The method of making a battery, which comprises placing a cell in a rubber hydrochloride casing, sealing the casing, applying electrical connections at the terminals of said battery but outside of said sealed casing, applying molten solder on the outside of said casing at the location of said terminals, causing the heat of said solder to destroy said casing to provide small openings through said casing at the point of soldering said electrical connections to said terminals, and causing said connections to be soldered to said terminals and at the same time closing the openings so provided in said casing by the solder so applied.

7. The method of making a battery, which comprises placing a cell in a rubber hydrochloride casing, sealing the casing, applying electrical connections at the terminals of said battery but outside of said sealed casing, applying molten solder on the outside of said casing at the location of said terminals, causing the heat of said solder to destroy said casing to provide small openings through said casing at the point of soldering said electrical connections to said terminals, and causing said connections to be soldered to said terminals and at the same time closing the openings so provided in said casing by the solder so applied, and applying additional material for sealing said openings.

HERMAN R. C. ANTHONY.
HENRY G. FRIANG.